United States Patent [19]

Kim et al.

[11] Patent Number: 5,492,125
[45] Date of Patent: Feb. 20, 1996

[54] ULTRASOUND SIGNAL PROCESSING APPARATUS

[75] Inventors: Yongmin Kim, Seattle; Jeffrey T. Reeve, Issaquah; Christopher H. Basoglu, Bothell; Ja-Il Koo, Issapuah, all of Wash.

[73] Assignee: University of Washington, Seattle, Wash.

[21] Appl. No.: 386,435

[22] Filed: Feb. 10, 1995

[51] Int. Cl.6 .................................................. A61B 8/00
[52] U.S. Cl. ......................................................... 128/660.07
[58] Field of Search ................... 128/660.01, 660.04, 128/660.05, 600.07, 661.08, 662.02; 395/135, 139, 800; 364/413.13, 413.22

[56] References Cited

U.S. PATENT DOCUMENTS 4,833,625  5/1989  Fisher et al. ........................... 395/139
5,313,648  5/1994  Ehlig et al. ............................. 395/800

*Primary Examiner*—George Manuel
*Attorney, Agent, or Firm*—Koda Law Office

[57] ABSTRACT

An ultrasound signal processing apparatus provides a programmable platform for various clinical ultrasound applications. The apparatus is part of an ultrasound medical diagnostic imaging system. Data is processed in real-time, near real-time or in delayed playback. In one embodiment a pair of multi-processors are coupled to shared memory via a cross-bar switch. System control data is input via a VME interface. Ultrasound data is input via frame buffers. A first multi-processor manages vector data transfers and scan-converted data acquisitions. A second multi-processor manages video data output. The two multi-processors split signal processing tasks. In various configurations the apparatus executes vector processing, scan conversion, image processing and/or video processing tasks.

19 Claims, 9 Drawing Sheets

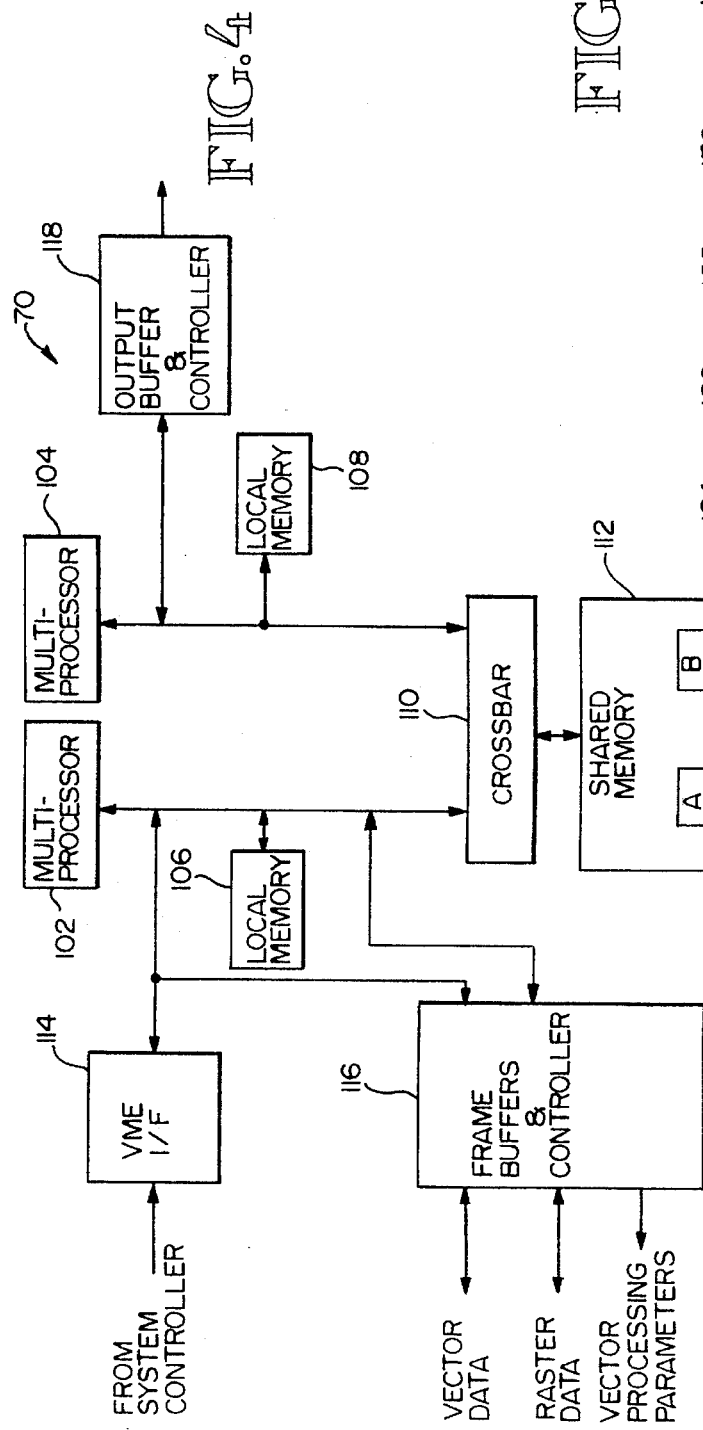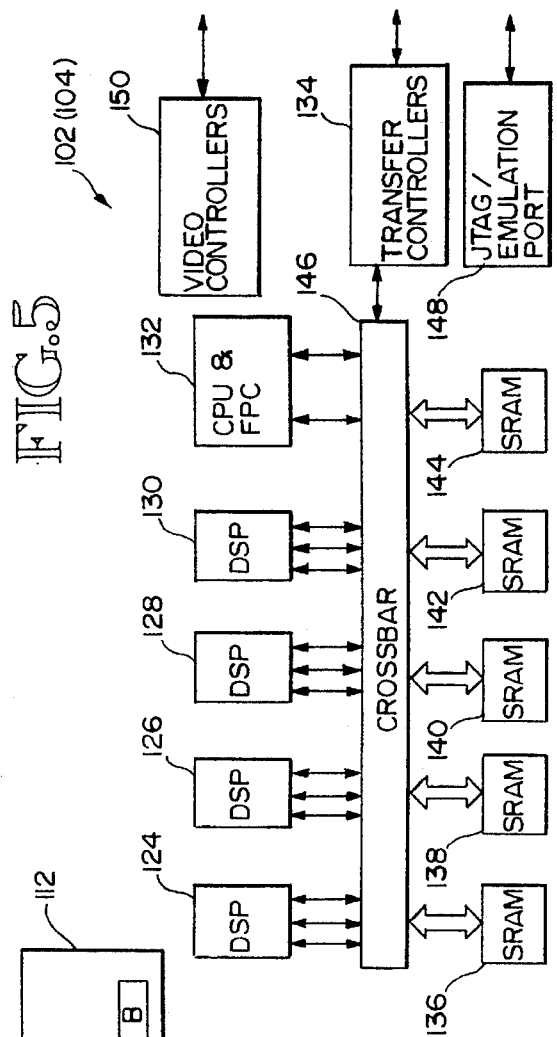

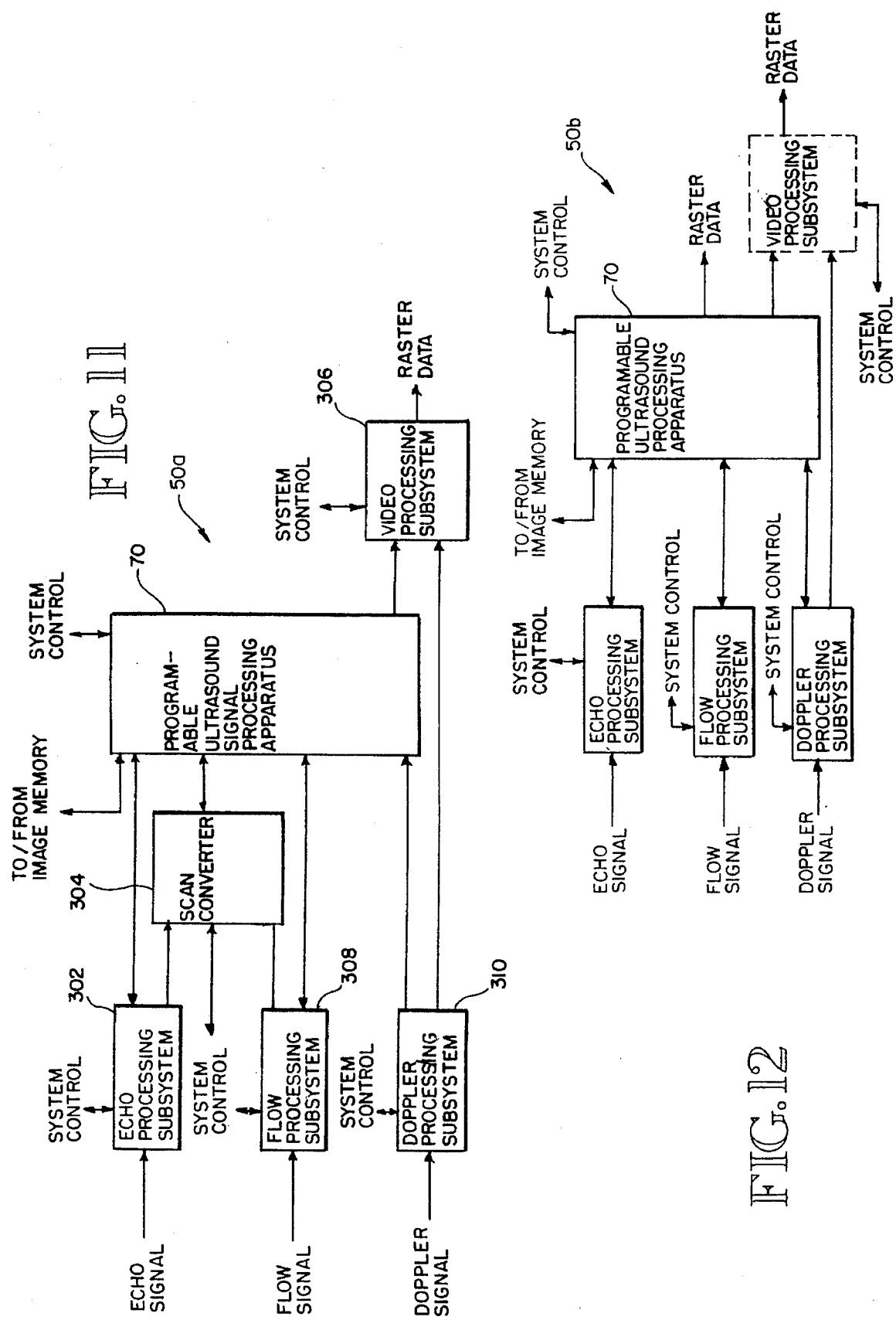

ULTRASOUND SIGNAL PROCESSING APPARATUS

BACKGROUND OF THE INVENTION

This invention relates to ultrasound medical diagnostic imaging systems, and more particularly to a programmable ultrasound signal processing apparatus for varying clinical applications.

Medical imaging systems are used as diagnostic tools for viewing internal areas of a patient's body. Imaging systems based on ultrasound technology are desirable because such systems are non-invasive, portable and generally easy to use. To produce enough images per second to support real time imaging of a patient, ultrasound systems conventionally require separate processing boards for each processing task. A given processing board is designed to do specific tasks and typically is redesigned if processing requirements or processing algorithms change. Thus, an ultrasound system, although, generally easy to use, conventionally is constructed using dedicated hardware subsystems.

The medical and ultrasound research community continue to explore new clinical applications for ultrasound technology. New clinical applications require many man-years of design engineering and clinical testing. Feedback during testing leads to changes in ultrasound system design and clinical application procedure. The development process typically is an iterative design process. Because different ultrasound processing boards are needed for changing requirements, the development time of a clinical application and ultrasound system design can be slow. Further, as state of the art circuit speeds increase, new board designs and architectures have been needed to incorporate such circuitry into an ultrasound system. In brief, conventional ultrasound system architectures have been characterized by a lack of versatility and lack of programmability. This has been a problem slowing the development of new clinical applications. Accordingly, there is a need for a versatile, programmable ultrasound system adaptable to new and varying clinical application requirements.

FIG. 1 shows a block diagram of a conventional ultrasound medical diagnostic imaging system 10. A system controller 12 receives and displays user control information via a user interface 14. During operation, system control signals are output to an ultrasound front end (i.e., transducer 18, transmitter 16, beam-former 20 and related circuitry) and to various subsystems. A transmitter 16 generates output signals to a transducer 18 to define aperture, apodization, focus and steering of ultrasound signals. The transducer 18 is an array of transducer elements. The elements define multiple channels, each channel for transmitting and/or receiving ultrasound signals. Transmitted ultrasound signals are in part absorbed, dispersed, refracted and reflected when travelling through a patient. Reflected signals are sensed by the transducer 18 and captured as a patterned beam by beam-former 20. The captured signals are sent to an echo signal processing subsystem 22, color flow processing subsystem 24 and/or doppler processing subsystem 26 according to the mode of operation.

The echo processing subsystem 22 performs echo signal processing to improve the echo signal's signal to noise ratio. In one implementation signal enhancement, energy detection and image enhancement filtering occurs. The color flow processing subsystem 24 estimates flow parameters using correlation, flow averaging and/or other processes. The doppler processing subsystem 26 determines doppler shift and performs frequency filtering to remove the doppler shift and improve spectral frequency response. In one doppler implementation signal enhancement, spectral estimation, energy detection and derived waveform filtering occurs.

Outputs of subsystems 22 and 24 are sent to a scan converter 28 which converts polar vector data or scales linear vector data into cartesian-coordinate raster data. The echo, flow and doppler data streams then are input to the video processing subsystem 30 which synchronizes data and generates image position, gray scale and color characteristics for visual and audio output devices 32. Output is displayed in real-time and/or stored via video cassette recorder for later playback. Typically a strip chart device also is included for showing a patient's physiological status. The echo processing subsystem 22, color flow processing subsystem 24 and doppler processing subsystem 26 designs vary according to the clinical application. Accordingly, there is a need for a more flexible architecture able to accommodate various ultrasound clinical applications.

SUMMARY OF THE INVENTION

According to the invention, an ultrasound signal processing apparatus provides a programmable data processing platform for various clinical ultrasound applications. The signal processing apparatus is a portion of an ultrasound medical diagnostic imaging system. Alternative data transformation processes are hosted by the apparatus according to the desired clinical application.

According to one aspect of the invention, the apparatus embodies a programmable image processing subsystem for adding image processing capability to an ultrasound system. Various image processing and image enhancement processes can be loaded in and executed, (e.g., histogram equalization, contrast limited adaptive histogram equalization, edge detection, boundary enhancement, 2-D graphics, 3-D volume visualization, tissue characterization, perfusion measurements, image segmentation, speckle reduction).

According to another aspect of the invention, the programmable ultrasound signal processing apparatus also hosts one or more vector processing (e.g., echo processing, flow processing, doppler processing) and/or scan conversion processes. Echo signal processing functions, such as signal enhancement filtering, energy detection and image enhancement filtering are hosted. Flow processing functions, such as correlation, flow averaging or another flow indicator derivation are hosted. Doppler signal processing functions, such as signal enhancement filtering, spectral estimation, energy detection, and derived waveform filtering are hosted. Thus, one or more vector processing functions previously implemented using dedicated hardware, alternatively, is hosted on the programmable apparatus. Further, scan conversion processes previously implemented in dedicated hardware, alternatively, are hosted on the programmable apparatus. Also, more effective solutions can be implemented by downloading differing computer processes.

According to another aspect of the invention, vector signal processing, scan conversion and image processing functions are performed in real-time or near real-time during ultrasound scanning of a patient. Alternatively, the functions are performed off-line in a delayed playback or "cine" playback mode.

According to another aspect of the invention, the programmable ultrasound signal processing apparatus includes one or more processors for executing various vector signal processing, scan conversion and/or image processing functions. According to one inventive embodiment, the ultrasound signal processing apparatus includes a pair of multi-processors, (e.g., a pair of multimedia video processor chips, each chip embodying a plurality of digital signal processors). The multi-processors are coupled to shared memory via a 2×2 crossbar switch. System data and control signals are input to the apparatus via a modified-VME interface. Vector data and/or scan-converted data is input to the apparatus via a pair of frame buffers. The frame buffers receive respective frames in an alternating buffer fashion. In one implementation the frame buffers also serve as an output path for processed vector data to be routed to vector processing subsystem(s) or to a scan converter. For other outputs a multi-processor routes processed raster data to an output buffer for forwarding to an output device or video processing subsystem.

The multi-processors perform vector processing tasks, image processing tasks and/or scan conversion. The specific processes executed vary according to the clinical application. Object code for one or more processes is loaded via the modified-VME interface and stored in a respective multi-processor's local memory.

According to another aspect of this invention, the first multi-processor manages system communications and data acquisition, while the second multi-processor manages video (e.g., raster) data output. The first multi-processor retrieves a first frame of data, processes the data in-part, then signals the second multi-processor to take control of the data frame. The second multi-processor then accesses the first frame through shared memory to finish processing the data. The processed data frame then is moved to an output buffer. The data then is output from the output buffer to an output device or video processing subsystem. While the second multi-processor is processing the first frame, the first multi-processor retrieves a second frame of data. In this manner, data frames cascade through the ultrasound signal processing apparatus.

According to alternative embodiments the programmable ultrasound signal processing apparatus includes multiple programmable processor boards configured for executing respective vector processing, image processing and scan conversion functions.

According to one alternative embodiment, the apparatus combines a programmable platform with conventional vector processing boards able to receive filter parameter inputs. As a result, the ultrasound signal processing apparatus is able to look ahead during real-time and near real-time operation to redefine and load vector processing subsystem filter parameters.

The problem addressed by this invention is the lack of flexibility in conventional ultrasound medical diagnostic system architectures. Such architectures are not readily adapted to new or evolving clinical applications, nor to advances in technology. The solution described here is to implement a versatile, powerful (e.g., fast, high throughput) ultrasound signal-processing architecture effectively programmed for a desired clinical application. Different computer programs embodying a vector processing, image processing, scan conversion and/or video processing function are loaded into the processors for a given clinical application. Instead of redesigning subsystems to adapt to a new clinical application, new software is loaded into the programmable, hardware configuration. A meritorious effect is that shorter time-to-market system configurations are achievable for new clinical applications. An advantage is that sophisticated data transformation processes are executed in real-time or near real-time to satisfy clinical diagnostic imaging requirements without "tailoring" (i.e., redesigning) dedicated application circuit boards. For various multi-processor embodiments, allocation of data management among multi-processors allows sophisticated ultrasound processing to be performed in real-time and near real-time.

BRIEF DESCRIPTION OF THE DRAWINGS

FIG. 4 is a block diagram of the programmable ultrasound signal processing apparatus according to an embodiment of this invention;

FIG. 5 is a block diagram for one embodiment of a multi-processor of FIG. 4;

FIG. 11 is a block diagram of a back-end processing subsystem configuration according to an embodiment of this invention;

FIG. 12 is a block diagram of a back-end processing subsystem configuration according to another embodiment of this invention.

DESCRIPTION OF SPECIFIC EMBODIMENTS

Overview

Figure 1:
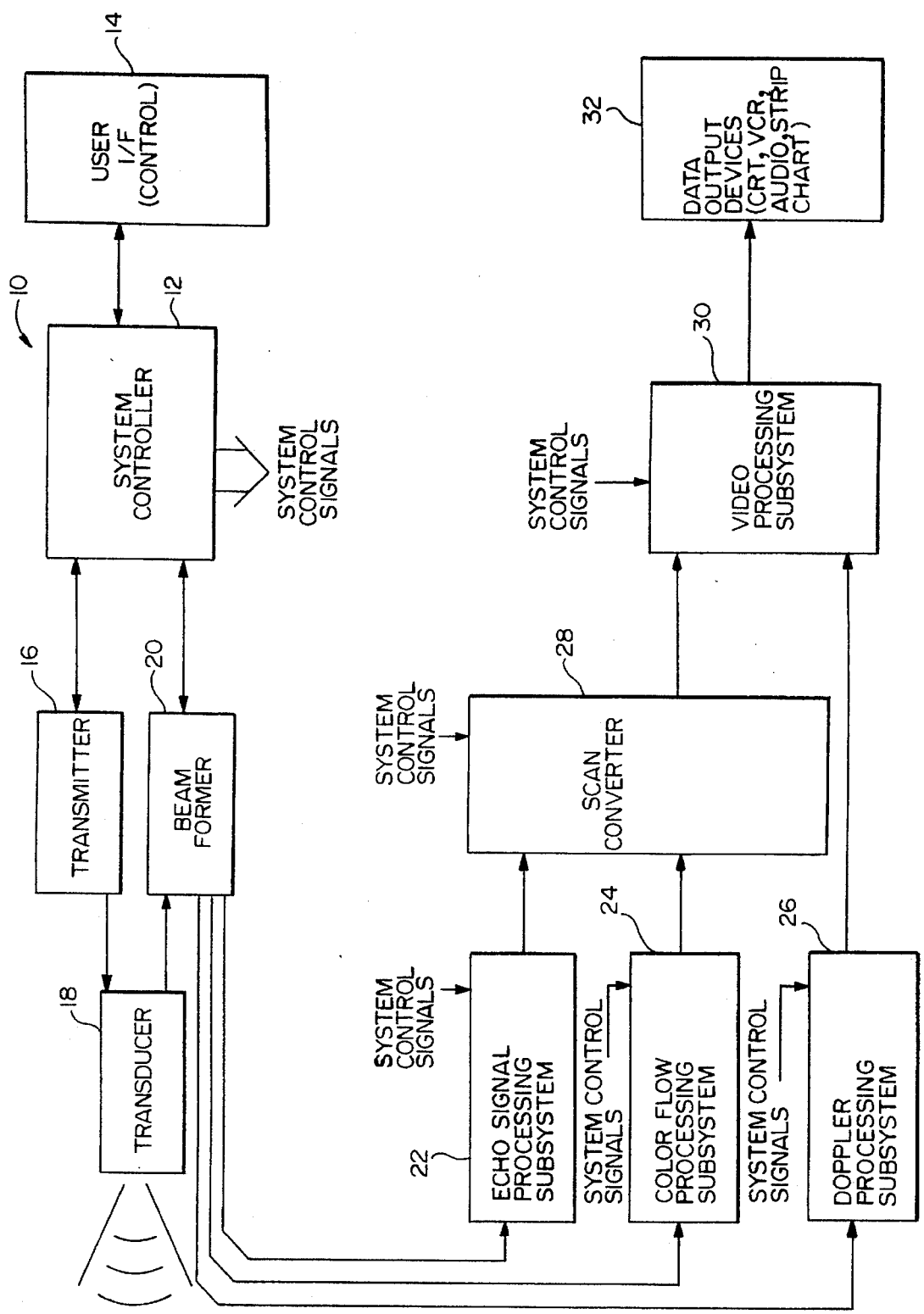
FIG. 1 is a block diagram of a conventional ultrasound medical diagnostic imaging system.
Figure 2:
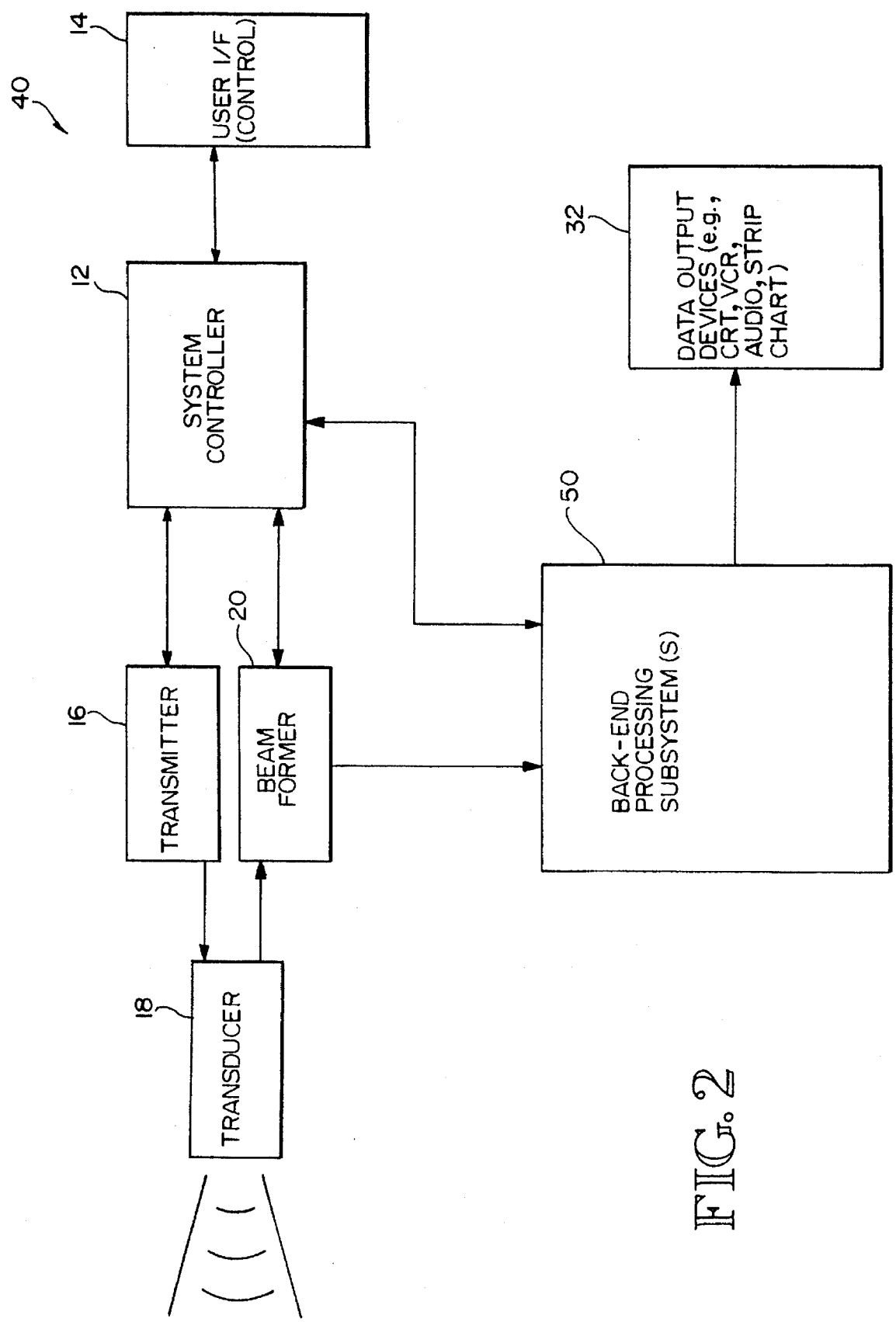
FIG. 2 is a block diagram of an ultrasound medical diagnostic imaging system with back-end processing according to an embodiment of this invention.

FIG. 2 shows a block diagram of an ultrasound medical diagnostic imaging system 40 having a back-end signal processing subsystem 50. Like portions of system 40 relative to system 10 (see FIG. 1) are shown with like numbers (i.e., system controller 12, user interface 14, transmitter 16, transducer 18, beam-former 20 and data output devices 32). The function of the system 40 is to perform diagnostic imaging of a patient using ultrasound data. Ultrasound signals are transmitted via transducer 18 into a patient. Reflected signals are detected and used to derive internal images of the patient for a scanned area/volume. The function of back-end processing subsystem(s) 50 is to process the raw beam data and generate image data for output devices 32.

Figure 3:
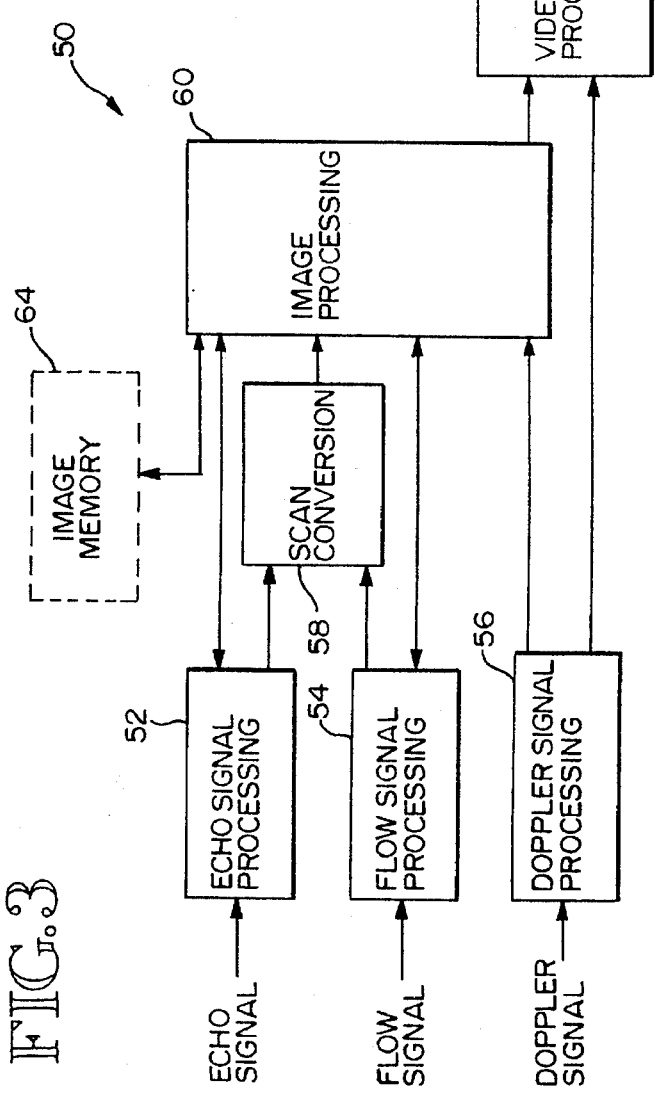
FIG. 3 is a functional block diagram of back-end processing in the system of FIG. 2 according to an embodiment of this invention.

FIG. 3 is a block diagram of back-end processing functions. Digital echo signals, flow signals and/or doppler signals are received at the back-end processing subsystem(s) 50 according to various modes of operation. Such input signals are referred to herein as vector signals. For a transducer 18 performing sector scanning, the vector signals are digital polar-coordinate data samples of echo, flow and/or doppler signals. For a transducer 18 performing linear scanning, the vector signals are digital cartesian-coordinate data samples of echo, flow and/or doppler signals.

Back-end processing includes echo signal processing 52, flow signal processing 54, doppler signal processing 56, scan conversion 58, image processing 60 and video processing 62. Echo signal processing 52 typically encompasses signal enhancement filtering, energy detection and image enhancement filtering. Various filtering and convolution techniques are employed. The purpose of echo signal processing 52 is to enhance the signal to noise ratio of the echo signal. Flow signal processing 54 analyzes signals for flow parameters. Typical parameter derivations include sample correlation and flow averaging. The purpose of flow signal processing 54 is to identify flow and turbulence within a scanned area. Doppler signal processing 56 typically encompasses signal enhancement filtering, spectral estimation processing, energy detection, and derived waveform filtering. The purpose of doppler signal processing 56 is to identify and filter out doppler shift, to improve spectral frequency response and to coordinate spectral mapping.

A scan conversion process 58 converts the processed vector data streams from echo signal processing 52 and flow signal processing 54. For polar-coordinate vector data the data is converted into cartesian-coordinate raster data. For cartesian-coordinate vector data the data is scaled into cartesian-coordinate raster data.

Image processing 60 includes image enhancement processes executed on the raster data or vector data. In an off-line delayed payback (e.g., cine playback) mode of operation image data, vector data and/or raster data is received from image memory 64 and processed. Image processing tasks for varying applications includes histogram equalization, contrast limited adaptive histogram equalization, edge enhancement, boundary enhancement, 2-D graphics, 3-D volume visualization, tissue characterization, perfusion measurements, image segmentation, edge detection and speckle reduction.

Video processing 62 executes on the image processed data to generate video signals, audio signals, and graphing signals for output to a display device, audio device, storage device (e.g., VCR) and/or charting device. Video processing 62 in some applications also executes on doppler processed vector data to generate similar video signals, audio signals, and graphing signals for output to the display device, audio device, storage device and/or charting device.

According to the invention, image processing 60, echo signal processing 52, flow signal processing 54, doppler signal processing 56, scan conversion 58 and/or video processing 62 are hosted on a programmable ultrasound signal processing apparatus 70. According to various configurations, the processing tasks 52–62 are hosted on one or more of such apparatus 70.

Programmable Ultrasound Signal Processing Apparatus

FIG. 4 shows a block diagram of the programmable ultrasound signal processing apparatus 70. Apparatus 70 includes multiple processors for performing the various vector processing, image processing, scan conversion and/or video processing tasks. In a specific embodiment a pair of processors 102, 104 are included. Data management is divided among the multiple processors 102, 104 so that a first processor 102 manages system and front end data communication, while a second processor 104 manages raster data output communication. The apparatus 70 also includes local memory 106, 108, crossbar switch 110, shared memory 112, modified-VME interface 114, frame buffer/controller 116 and output buffer/controller 118.

Processors:

In one embodiment each processor 102, 104 includes one or more digital signal processors. In a specific embodiment each processor 102, 104 is a multi-processor, such as a Texas Instruments multimedia video processor ("MVP") (part no. TMS320C80). FIG. 5 shows a block diagram of an MVP multi-processor. The MVP combines on a single semiconductor chip, four fully programmable digital signal processors 124, 126, 128, 130 and a master processor 132 for handling multiple data streams via a transfer controller 134. Several on-chip random access memory (RAM) devices 136, 138, 140, 142, 144 serve as resident memory accessible to the digital signal processors (DSPs) 124–130 via a crossbar network 146. The MVP has a throughput rating of approximately 2 billion operations per second. The master processor 132 is a RISC processor with an integral floating point unit. According to this embodiment the master processor 132 coordinates and distributes processing tasks among the DSPs 124–130 and manages external off-chip communications. A JTAG/emulation port 148 is included for aid in testing, development and diagnostics.

Each DSP 124–130 includes two address generators, three input 32-bit ALUs, a 16×16 multiplier, three zero-overhead loop controllers, and a 32-bit barrel shifter. Each RAM 136–144 has a 10 kB capacity providing 50 kB of single-cycle SRAM. Memory 136–144 is partitioned in blocks with each block serving as either data RAM, parameter RAM, data cache or instruction cache. The data caches and instruction caches serve as a primary cache. The transfer controller 134 services the on-chip caches and interfaces to external memory (e.g., local memory 106 or 108, and shared memory 112).

The MVP also includes a pair of video controllers 150. Controllers 150 generate video synchronization signals or synchronize data transfer rates with external video signals.

Local Memory, Shared Memory, Crossbar:

Referring again to FIG. 4 each multi-processor 102, 104 has a respective dedicated local memory 106, 108, serving as a secondary cache. Each local memory 102, 104 has capacity for storing a frame of ultrasound data. In one embodiment a 2 MB capacity is provided at each local memory 102, 104. In addition shared memory 112 is included. In one embodiment shared memory 112 is implemented as two separate 64 MB memory banks 120, 122 for a total of 128 MB shared memory. The storage capacity of local memory 102, 104 and shared memory 112 varies for alternative embodiments. The multi-processors 102, 104 access shared memory through crossbar switch 110. For a two multi-processor embodiment, a 2×2 crossbar switch is implemented. The purpose of the crossbar switch 110 is to allow the multiple processors 102, 104 simultaneous access to the shared memory banks. The crossbar switch 110 includes a pair of transceivers for each input channel, along with a crossbar controller.

The function of the crossbar controller is (i) to manage requests for access and (ii) to refresh shared memory 112. If a multi-processor 102 requests access to a shared memory bank 120, 122 not currently being accessed by the other multi-processor 104, then the access is granted. If the multi-processor 102 requests access to a shared memory bank 120, 122 currently being accessed, then the multi-processor 102 waits until the memory bank is available. Simultaneous access to a shared memory bank 120, 122 thus is available when the accesses are to separate memory banks. For reconciling simultaneous requests for access, one multi-processor 102 is prescribed to have priority for a specific one shared memory bank 120, while the other multi-processor 104 is prescribed priority for the other shared memory bank 122. If both multi-processors 102, 104 request access to a common bank, then the processor with the prescribed priority for that bank is granted access. However, to avoid lengthy delays, the other multi-processor is granted access after the current access, even if the higher priority multi-processor comes right back with a second request. For example, consider the case in which multi-processor 102 has the prescribed priority to the first memory bank 120. The first multi-processor 102 makes two sequential requests for access to bank 120, while multi-processor 104 also makes a request to bank 120. Because of the prescribed priority, the first multi-processor 102 is granted access for its first request. Next, however, the second multi-processor 104 is granted access. Then, the first multi-processor 102 is granted access for its second request.

Modified-VME Interface:

System control signals are received by apparatus 70 from the system controller 12 via a modified-VME interface 114. The modified-VME interface 114 is similar to a standard VME interface, but with a different connector size so as to fit into an ultrasound system 40 back-plane. The communication protocol is VME standard with unnecessary signals not being supported. In an alternative embodiment a standard VME interface is used.

The modified-VME interface includes a back-plane interface, an external address decoder/controller, an interrupt requester, an internal address decoder/controller and dual port memory. The back-plane interface couples the apparatus 70 to a system 40 bus enabling communication with the system controller 12. System data and control signals are received via the back-plane interface and stored in the dual-port memory based upon address decoding and interrupt-based handshaking. Dual port memory has a receive buffer and a transmit buffer. In a specific embodiment the dual port memory is a 2K×16 dual port RAM. Processor bus transceivers isolate the multi-processor 102, 104 address and data busses from the system bus.

For data flow from the system controller 12 into the apparatus 70, the system controller 12 writes data into the transmit buffer. The system controller 12 then signals the VME interrupt requester, which in turn generates an interrupt to the first multi-processor 102. Multi-processor 102 reads the transmit buffer, then signals the VME interface to generate an interrupt to the system controller 12 signifying that the transmit buffer is available for loading.

Data flow from the apparatus 70 to the system controller 12 is similarly controlled. Multi-processor 102 writes data into the receive buffer, then signals the VME interrupt requester to generate an interrupt to the system controller 12. The system controller 12 reads from the receive buffer, then signals the VME interrupt requester to interrupt multi-processor 102 to signify that the receive buffer is available for loading.

Figure 6:
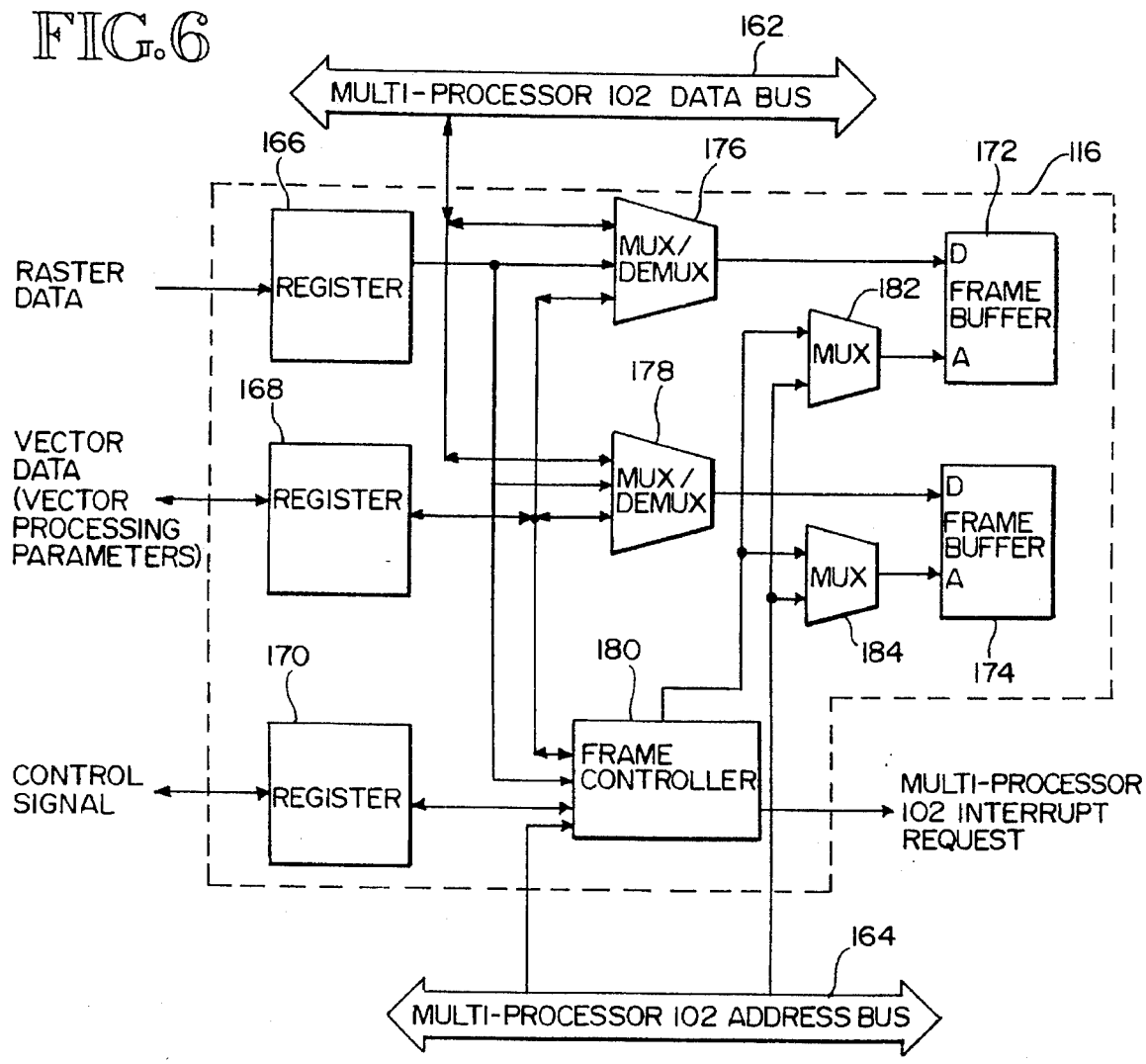
FIG. 6 is a diagram of the input frame buffers of FIG. 4 according to one embodiment.

Frame Buffer/Controller:

The frame buffer/controller 116 serves as a data interface with an ultrasound front end, another programmable ultrasound signal processing apparatus 70, another back-end processing subsystem and/or image memory 64. FIG. 6 shows a block diagram of the frame buffer/controller 116. For an input operation, the frame buffer/controller 116 receives vector data or raster data. Multi-processor 102 then reads the data via a data bus 162 and address bus 164. For an output operation the frame buffer/controller 116 receives processed vector data or vector processing parameters from the multi-processor 102 via data bus 162, address bus 164, then outputs the vector data or parameters to another programmable ultrasound signal processing apparatus 70 or another back-end processing subsystem.

Frame buffer/controller 116 includes respective registers 166, 168, 170. One register 166 passes raster data into the apparatus 70. Another register 168 passes vector data into or out of the apparatus 70, or vector processing parameters out of the apparatus 70. The third register 170 passes control signals to and from the ultrasound front end, another programmable ultrasound signal processing apparatus 70 or another back-end processing subsystem during a data transfer.

For raster data, a data frame passes through register 166 into either one or both of frame buffer A 172 and frame buffer B 174 via mux/demux 176, 178. A mux/demux 176, 178 in one embodiment is a D-type latch bus exchanger. A controller 180 determines the frame buffer 172, 174 and specific address within the selected frame buffer that a data item is to be stored. For raster data frames of a size to fit within a single frame buffer 172 or 174, sequential frames are loaded into alternating buffers 172, 174. For larger "over-sized" frames beyond the capacity of a single frame buffer 172 or 174, data initially is targeted for one frame buffer, then when the buffers fills, the excess is stored in the other frame buffer. For vector data, a data frame passes through register 168 into alternating frame buffers 172, 174.

Controller 180 configures the multiplexer/demultiplexer 176 to define the data path to be coupled to the frame buffer 172 at a given time. Data is loaded into frame buffer 172 from register 166, register 168 or multi-processor 102 data bus 162. Data is removed from frame buffer 172 to register 168 or multi-processor 102 data bus 162. Similarly, controller 180 configures the multiplexer / demultiplexer 178 to define the data path to be coupled to the frame buffer 174 at a given time. Data is loaded into frame buffer 174 from register 166, register 168 or multi-processor 102 data bus 162. Data is removed from frame buffer 174 to register 168 or multi-processor 102 data bus 162.

Each frame buffer 172, 174 is addressed by either the controller 180 or the multi-processor 102. A multiplexer 182 defines the address signal source for frame buffer 172. A multiplexer 184 defines the address signal source for frame buffer 174. Controller 180 selects the active address signal source channel at multiplexers 182, 184.

When a complete frame of data is received, controller 180 generates an interrupt to multi-processor 102. This signals multi-processor 102 to retrieve the frame for processing.

In a specific embodiment, echo data is received along one or more channels at an 18 MHz burst. The maximum burst per channel is referred to as a vector. In one embodiment, a vector can be up to 1024 12-bit echo depth samples and a frame can be up to 512 vectors of echo depth data. For scan-converted raster data, the maximum burst is a raster frame of converted vectors.

Frame Controller Modes: The apparatus 70 receives raster B-mode data, raster BC-mode data, vector B-mode data, or vector BC-mode data. The frame controller 180 operates in a primary mode or a secondary mode. In the primary frame controller mode raster data (e.g., B-mode or BC-mode) is received. In the secondary frame controller mode vector data (e.g., B-mode or BC-mode) is received.

For the primary mode, a B-mode raster data frame fits within a single frame buffer 172 or 174. A BC-mode raster data frame, however, requires either or both of the two frame buffers 172, 174. During a frame input, the controller 180 monitors the data header of incoming raster lines. The system controller 12 communicates to the controller 180 via VME interface 114 and multi-processor 102 specifying how many input channels are active:. The controller 180 activates appropriate transceivers and generates address and control signals for storing the data in the frame buffer(s) 172, 174. Subsequent B-mode data frames are input into alternating frame buffers. Subsequent BC-mode data frames are input into alternating or the pair of frame buffers 172, 174 as the pair becomes available.

For the secondary mode, a vector data frame fits within a single frame buffer 172, 174. During a frame input, the controller 180 monitors the data header of incoming vectors. Once a vector header is detected, the data is routed from each active input channel (e.g., 1, 2 or 4 channels) to a select frame buffer 172, 174. The system controller 12 communicates to the controller 180 via VME interface 114 and multi-processor 102 specifying which input channels are active. The controller 180 activates appropriate transceivers and generates address and control signals for storing the data in the selected frame buffer 172, 174. Subsequent vector data frames are input into alternating frame buffers.

Figure 7:
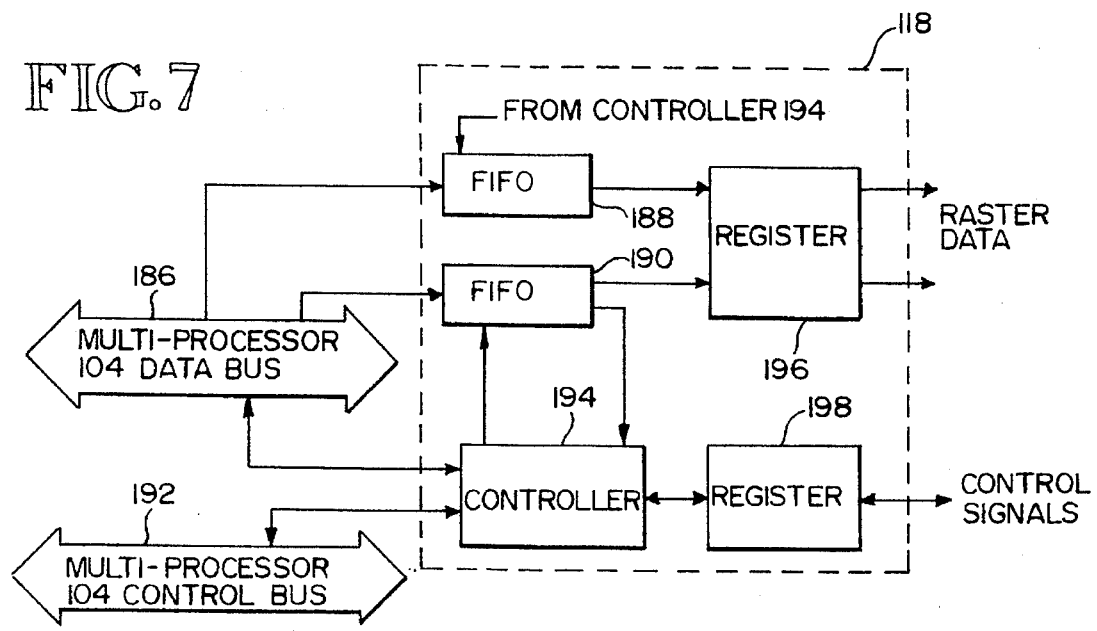
FIG. 7 is a diagram of the output buffer of FIG. 4 according to one embodiment.

Output Buffer/Controller:

The output buffer/controller 118 serves as a data interface between the apparatus 70 and another programmable ultrasound signal processing apparatus 70, another back-end processing subsystem (e.g., vector processing subsystem), or one or more output devices. FIG. 7 shows a block diagram of the output buffer/controller 118. Output data is received from the multi-processor 104 via data bus 186 at first-in first-out buffers 188, 190. Control data is received from multi-processor 104 via control bus 192 at controller 194. Multi-processor 104 loads lines of raster data into a FIFO 188, 190 by writing a data header followed by raster-coordinate data. At the end of the last raster line in a group loaded a tag value is written. The controller 194 detects the flag during subsequent output to identify the end of the group.

In one embodiment, the output buffer/controller 118 serves to buffer multiple lines (e.g., 4 lines) of raster data per window. Windows are then output in a burst mode to a video processing subsystem or directly to an output display device 32. The raster data is moved from the FIFOs 188, 190 into register 196. The raster data is output from register 196 on two channels with one channel transmitting even pixels, and the other channel transmitting odd pixels. The data bursts occurs either synchronously or asynchronously with a VSYNC signal according to the mode of operation.

The controller 194 begins moving data from FIFOs 188, 190 through register 196 out of the apparatus 70 when a FIFO 188,190 nears a first programmed level. FIFOs contain one or more raster lines. The controller 194 arbitrates for a system bus via register 198. When the bus is obtained, the controller 194 begins to burst raster data. Bus protocol is maintained by control signals transmitted/received at controller 194 via register 198. When the FIFO 188, 190 nears a second (lesser) programmed level, the controller 194 signals multi-processor 104 to begin loading another line of data. At some point during the output process, the controller 194 detects the end of window tag. In response, the controller 194 releases the bus at the end of the window and waits for multi-processor 104 to begin transferring the next window.

Apparatus 70 Data Flow

Figure 8:
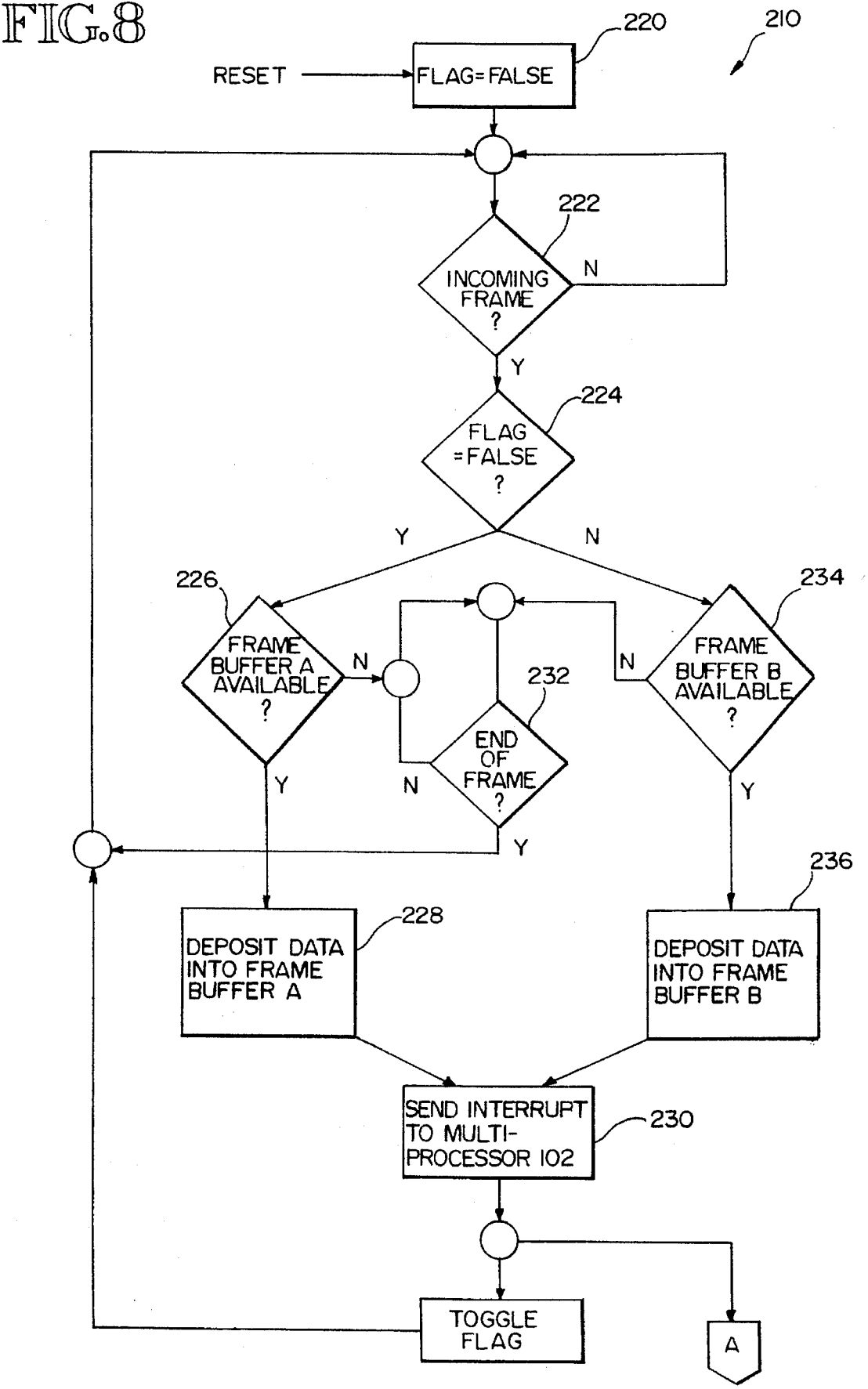
FIGS. 8–10 are flow charts of data movement through the programmable ultrasound signal processing apparatus of FIG. 4 according to one embodiment of the invention.
Figure 9:
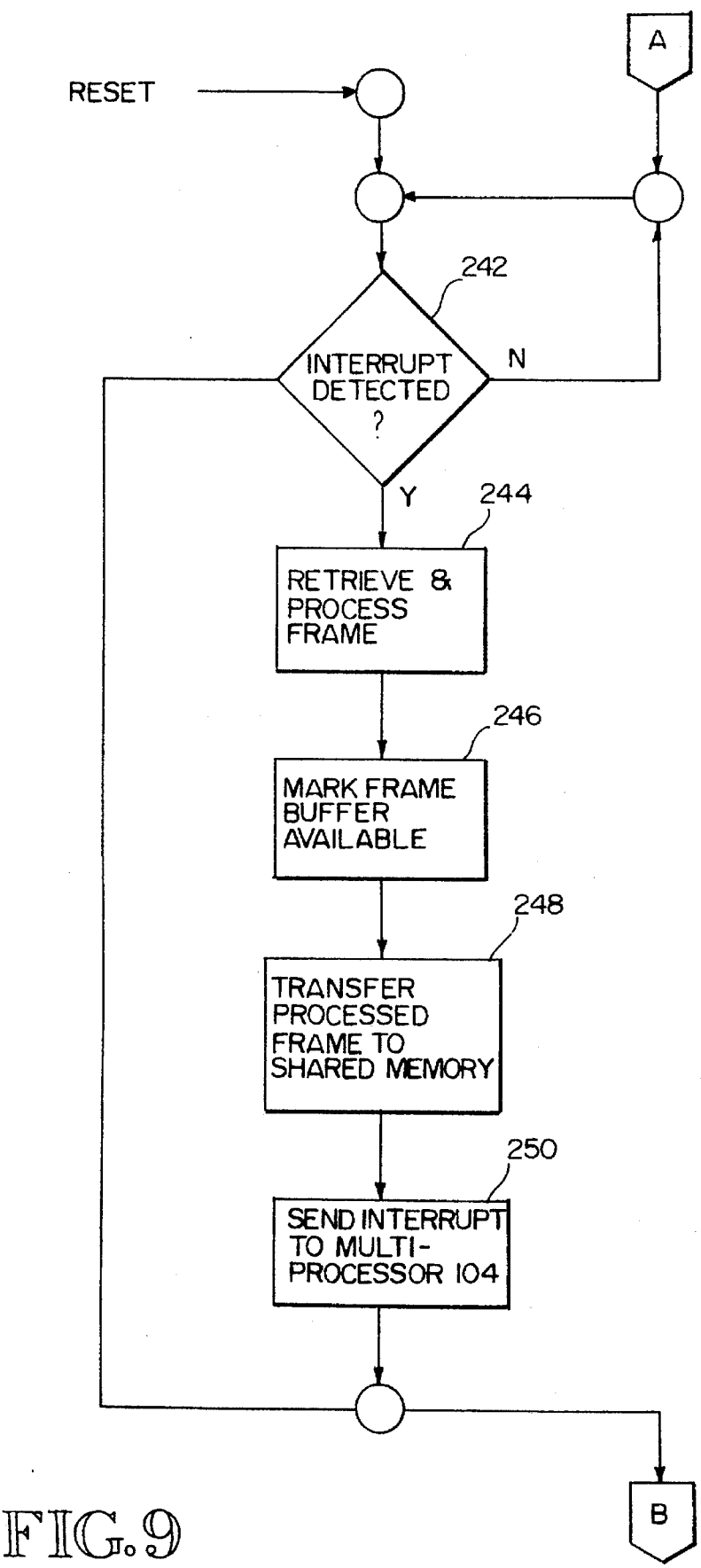
Figure 10:
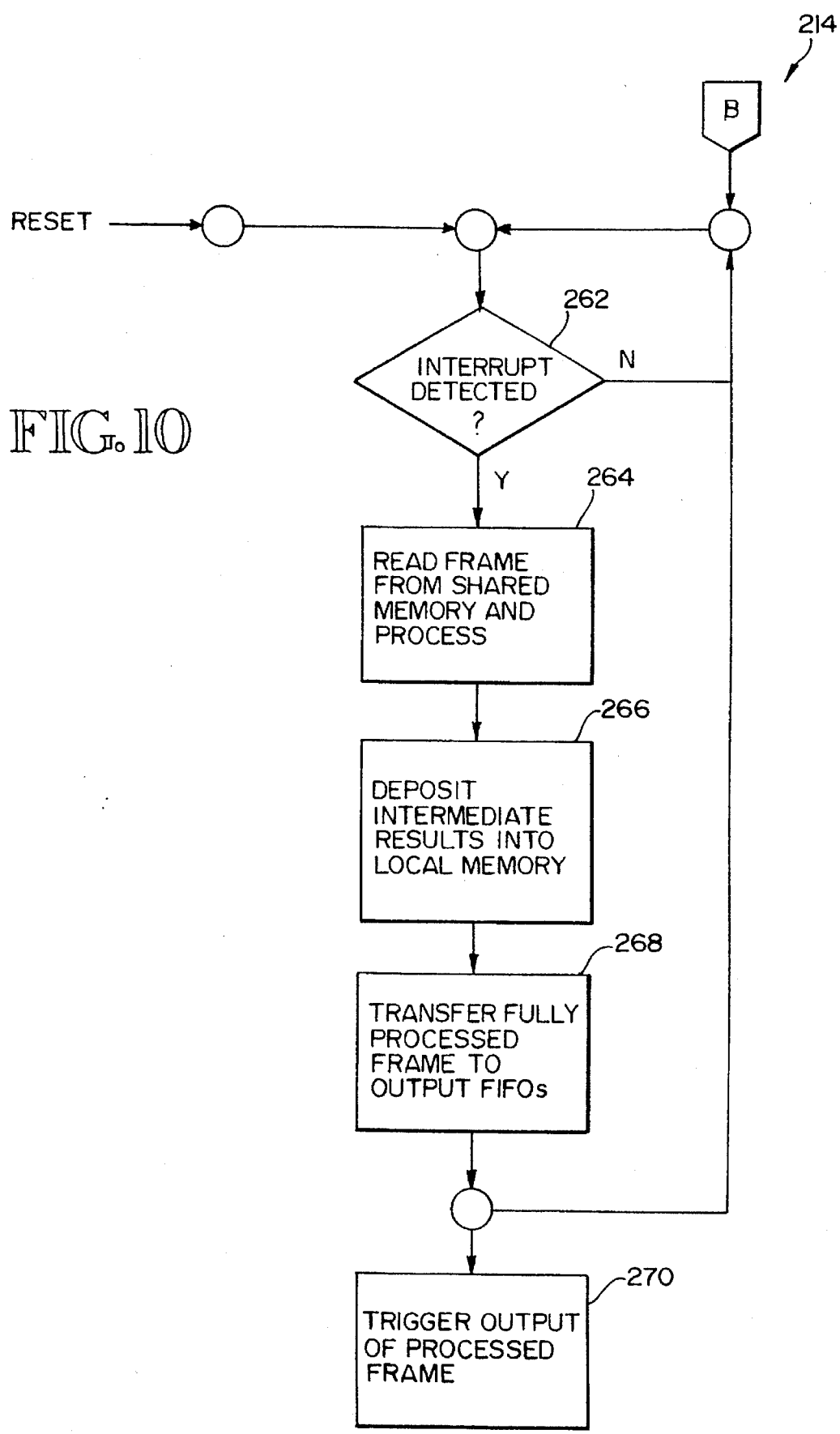

FIGS. 8–10 show flow charts depicting data movement through the programmable ultrasound signal processing apparatus 70. FIG. 8 depicts the frame controller's 180 process 210. FIG. 9 depicts the first multi-processor's 102 data flow process 212. FIG. 10 depicts the second multi-processor's 104 data flow process 214.

Referring to FIG. 8 the frame controller process 210 begins with a system reset or self reset of a FLAG at step 220. The frame controller 180 then awaits an incoming frame at step 222. When a frame is incoming, the controller 180 tests FLAG at step 224 to see if it is 'false'. If false, then the controller 180 tests frame buffer 'A' 172 to determine if available. If available, then at step 228 the frame of data is deposited into frame buffer 'A'. If the frame does not fit within frame buffer 172, then the rest of the frame is deposited in frame buffer 174 when it becomes available. Once the entire frame is deposited into frame buffer 172(174), the controller 180 generates an interrupt to the first multi-processor 102 at step 230. This triggers the multi-processor 102 data flow process 212 of FIG. 9. Controller 180 then toggles FLAG to be 'true.'

If at step 226 frame buffer 172 was found to be unavailable, then the multi-processors 102, 104 are not keeping up with the data flow. In this situation imaging is performed in near real-time. The current frame then is dropped at step 232. Frame controller 180 then returns to step 222 and waits for another data frame.

Once an interrupt is sent to the multi-processor 102 and FLAG is set 'true,' controller 180 loops to step 222 and again waits for an incoming frame. Once the frame arrives, controller 180 performs step 224 testing FLAG. This time FLAG is 'true.' Thus, controller branches to step 234 where frame 'B' 174 is tested to see if available. If available, then at step 236 the frame of data is deposited into frame buffer B 174. If the frame does not fit within frame buffer 174, then the rest of the frame is deposited in frame buffer 172 when it becomes available. Once the entire frame is deposited into frame buffer 174(172), the controller 180 generates an interrupt to the first multi-processor 102 at step 230. This triggers the multi-processor 102 data flow process 212 of FIG. 9. Controller 180 then toggles FLAG to be 'false'

If at step 234 frame buffer 174 was found to be unavailable, then the multi-processors 102, 104 are not keeping up with the data flow. Thus, the current frame is dropped at step 232. Controller 180 then returns to step 222 waiting for another data frame.

In this manner, sequential data frames are loaded alternatively in frame buffers 172 then 174 for frames of a size less than frame buffer capacity. For an over-sized frame, a first portion of the frame is loaded into one frame buffer, then the remaining portion is loaded into the other frame buffer.

Referring to FIG. 9, the first multi-processor 102 data flow process 212 begins with a reset. At step 242 multi-processor 102 waits for the interrupt from frame controller 180. Once the interrupt is detected and serviced, multi-processor 102 retrieves the frame from the frame buffer(s) 102, 104. The frame is moved into on-chip memory 136–144 and/or local memory 106, then processed at step 244. Processing tasks are allocated between the first multi-processor 102 and second multi-processor 104. Thus, the frame is processed in part (e.g., vector processing subsystem parameters are derived; part of data transformation processes performed). Once the first multi-processor's tasks on the frame are complete, at step 246 the multi-processor 102 marks the originating frame buffer as being available for reloading. At step 248 the processed frame data is moved to shared memory 112. At step 250, multi-processor 102 generates an interrupt at multi-processor 104. Multi-processor 102 then loops to step 242 to await the next interrupt so another frame of data can be processed.

Referring to FIG. 10, the second multi-processor 104 data flow process 214 begins with a reset. At step 262 multi-processor 104 waits for the interrupt from multi-processor 102. Once the interrupt is detected and serviced, multi-processor 104 reads the partially processed frame from shared memory 112. The frame is moved into on-chip memory 136–144 and/or local memory 108, then processed at step 264. Processing at multi-processor 104 includes any remaining signal processing tasks of the data transformation processes. During processing, intermediate results are stored in local memory 108 at step 266. At step 268 a fully processed frame is sent to the output buffer FIFOs 188, 190 (see FIG. 7). At step 270 multi-processor 104 signals the output buffer controller 194 to output the frame to the video processing subsystem 30 and/or output devices 32.

Back-End Processing Configurations

Figure 13:
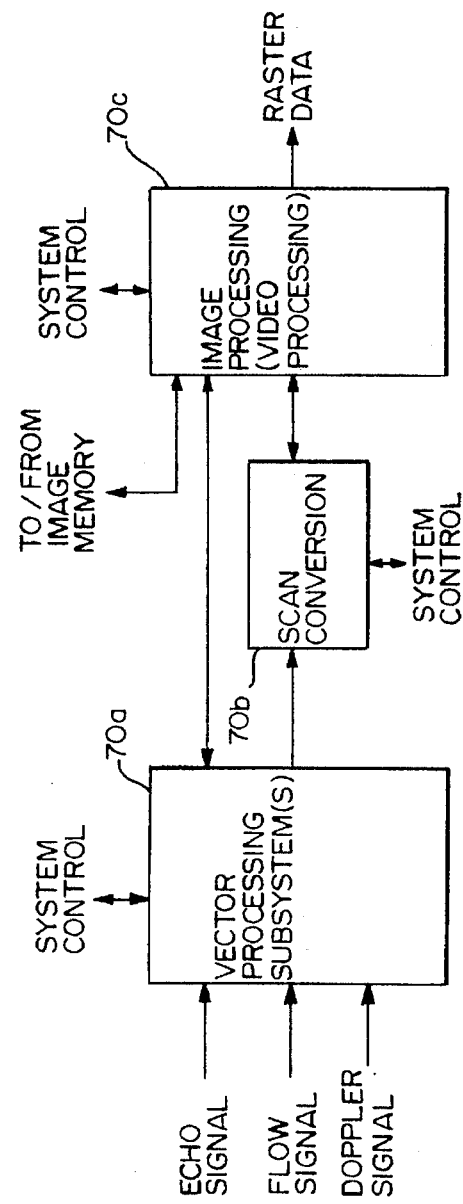
FIG. 13 is a block diagram of a back-end processing subsystem configuration according to another embodiment of this invention.

FIGS. 11–13 shows alternate back-end processing configurations embodying the programmable ultrasound signal processing apparatus 70. FIG. 11 shows an apparatus 70 configured to do image processing. Echo signals are input to a conventional echo processing subsystem 302 and filtered to improve the signal to noise ratio. Echo data vectors then are output to a conventional scan converter 304 where polar data is converted to cartesian-coordinate raster data and cartesian data is scaled to cartesian-coordinate raster data. Flow signals are input to a flow processing subsystem 308 where flow indications are derived. Flow data vectors then are output to the scan converter 304 for conversion and/or scaling to cartesian-coordinate raster data. Detailed embodiments of exemplary scan converters are described in: U.S. Pat. No. 4,386,528—"Method and Means for Generating Pixel Data in an Ultrasonic Scanning System" (Engle); U.S. Pat. No. 4,581,636— "Scan Conversion Apparatus and Method" (Blaker et al.); U.S. Pat. No. 5,295,488—"Method and Apparatus for Projecting Diagnostic Images from Volumed Diagnostic Data;" and U.S. Pat. No. 5,148,810— "Variable Origin-Variable Angle Acoustic Scanning Method and Apparatus."

The converted echo and flow raster data then is input to the apparatus 70 which performs image processing. The processed data then is output to a conventional video processing subsystem 306. Doppler signals are input to a doppler processing subsystem 310 where doppler shift is filtered and frequency response is enhanced. Doppler data then is input to the apparatus 70 for further processing or direct to the video processing subsystem 306. An alternative data flow is for vector data first to be sent to apparatus 70 for image processing, then routed to the scan converter 304 for conversion/scaling.

For varying applications, the apparatus 70 in the configuration of FIG. 11 also serves to derive vector processing parameters for any of the echo processing subsystem 302, flow processing subsystem 308 or doppler processing subsystem 310, ("vector processing subsystems"). For example, the vector processing subsystems 302, 306 and 310 perform various filtering tasks. Filter parameters are loaded into the subsystems 302, 308, 310 to change the filter characteristics. This is performed in a look-ahead process to anticipate changing filter needs during real-time and near real-time ultrasound imaging of a patient. In another application the apparatus 70 off-loads certain vector processing tasks to handle new, other, changing, or complex operations. For example, echo processing typically involves time domain filtering. However, more complex frequency domain filtering or wavelet domain filtering may be off-loaded to apparatus 70. Accordingly, vector data may flow back and forth between the vector processing subsystems 302, 308 and 310 with apparatus 70 replacing or supplementing various vector processing tasks.

FIG. 12 shows another configuration 50b of back-end processing in which the programmable apparatus 70 serves as both an image processor and scan converter. For this configuration scan conversion is performed in software rather than via dedicated hardware. In addition, the apparatus 70 can perform vector processing to off-load the vector processing subsystems 302, 308 and 310 or derive vector processing parameters for routing to the vector processing subsystems 302, 308, 310. Further, the apparatus 70 is able to perform video processing tasks or simply route raster output data to a video processing subsystem 306.

FIG. 13 shows yet another configuration 50c in which a plurality of programmable ultrasound signal processing subsystems 70 are linked to perform vector processing, scan conversion, image processing and/or video processing. In the embodiment illustrated, one or more apparatus 70a serve as vector processing subsystems performing the tasks of the echo processing subsystem 302, flow processing subsystem 308 and doppler processing subsystem 310. By implementing the tasks in apparatus 70a, changing processing requirements are accommodated without hardware redesign. Alternate filter embodiments or other computer program processes are simply loaded. Also, an apparatus 70b serves as a scan converter for converting/scaling vector data into cartesian-coordinate raster data. An apparatus 70c serves as an image processor and/or video processor.

Exemplary Apparatus 70 Processing Tasks

The programmable ultrasound signal processing apparatus 70 performs a variety of processing tasks. Exemplary image processing tasks include: histogram equalization, contrast limited adaptive histogram equalization, edge detection, boundary enhancement, 2-D graphics, 3-D volume visualization, tissue characterization, perfusion measurements, image segmentation, speckle reduction, image registration. Other exemplary image processing tasks include: data compression/decompression, dithering, rotation, pixel replication, image extraction, image flipping, floor value setting, threshold color, sharpen image, remap image, image insertion, image inversion, gray-level inversion, gray-level clipping, color space conversion, image morphing, image closing, image dilation, image erosion, image normalization, pixel replacement, pixel shifting, image format conversion (e.g., NTSC, RGB, HLS, HSV), wiener restoration, and noise modelling (e.g., gaussian noise data set, linear periodic signal, Rayleigh distribution, uniform noise distribution, exponential noise distribution).

Exemplary vector processing tasks include: frame interpolation, Sobel, Canny's or Laplacian edge detection, correlation, cross correlation, convolution, discrete or fast Fourier transformation (1D, 2D), filter coefficient conversion, varying filter operations, data mirroring, warp data, peak analysis, scaling, energy (e.g., magnitude, power, phase) detection, apodization functions, domain multiplication, dynamic thresholding, domain conversion, and median filtering.

Exemplary scan conversion tasks include converting from polar to cartesian coordinates and scaling data.

Ending Remarks

Although a preferred embodiment of the invention is illustrated and described, various alternatives also are used. For example, although a MVP chip is described as a specific multi-processor embodiment, other multi-processors may be used. Although memory for receiving computer processes is described as RAM, ROM or other non-volatile memory devices may be used. Although the output buffers are described as first-in first-out buffers, other stack buffers, frame buffers or window buffers may be used. Similarly, the various memory capacities, buffer capacities and transfer rates may vary. The disclosed architecture is scalable. In an embodiment having four multiprocessors, one manages transfers between the vector processing subsystems or front end (e.g., multiprocessor 102), another manages video data output (e.g., multiprocessor 104), while the remaining two or all four perform signal processing tasks (e.g., vector processing, image processing, scan conversion, video processing).

What is claimed is:

1. An ultrasound signal processing apparatus, comprising:

an image processing apparatus receiving real-time data frames of either one of ultrasound vector data or ultrasound raster data corresponding to a current ultrasound scan of a patient, the image processing apparatus for performing an image enhancement process on said received data frames to generate real-time or near real-time ultrasound images, said image processing apparatus programmable to receive object code embodying the image enhancement process, the image processing apparatus comprising:

a pair of frame buffers for receiving said data frames;

a first processor for accessing a first ultrasound data frame from either one or both of said pair of frame buffers, (ii) for executing first processing tasks upon the first ultrasound data frame to generate a processed data frame, and (iii) for generating a first processor completion signal upon completing said first processing tasks; and all output buffer for receiving the processed data frame.

2. The ultrasound signal processing apparatus of claim 1, further comprising:

a vector processing apparatus receiving real-time data frames of ultrasound vector data corresponding to a current ultrasound scan of a patient, the vector processing apparatus for performing any one or more of: (i) improving signal to noise ratio of an ultrasound echo signal, (ii) identifying flow within a scanned area of a patient by analyzing flow parameters in an ultrasound flow signal, and (iii) identifying and removing doppler shift from an ultrasound doppler signal; and said vector processing apparatus programmable to receive object code embodying a vector processing task.

3. An ultrasound signal processing apparatus comprising;

an image processing apparatus receiving real-time data frames of either one of ultrasound vector data or ultrasound raster data corresponding to a current ultrasound scan of a patient, the image processing apparatus for performing an image enhancement process on said received data frames to generate real-time or near real-time ultrasound images, said image processing apparatus programmable to receive object code embodying the image enhancement process, the image processing apparatus comprising:

a pair of frame buffers for receiving said data frames;

a first multi-processor (i) for accessing a first ultrasound data frame from either one or both of said pair of frame buffers, (ii) for executing first processing tasks upon the first ultrasound data frame to generate a first-processed data frame, and (iii) for generating a first processor completion signal upon completing said first processing tasks;

memory for storing the first-processed data frame;

a second integrated multi-processor (i) for receiving the first processor completion signal and in response executing second processing tasks upon the first-processed data frame to generate a second-processed data frame, and (ii) for moving the second-processed data frame;

a crossbar switch for coupling said memory to each of said first and second integrated multi-processors, said first-processed data frame accessible by said second integrated multi-processor through said memory and crossbar switch; and an output buffer for receiving the second-processed data frame; and wherein the first processing tasks and second-processing tasks comprise ultrasound image processing tasks.

4. The apparatus of claim 3, in which said image processing apparatus further comprises:

a frame controller for determining which one of the pair of frame buffers receives incoming data of the first ultrasound data frame at a given time; and an output buffer controller for outputting the second-processed data frame in response to a control signal from the second multi-processor.

5. The apparatus of claim 3, in which intermittent frames in a sequence of ultrasound data frames are dropped when a frame buffer is unavailable for loading resulting in a sequence of near real-time first ultrasound data frames being loaded into the pair of frame buffers, said first integrated multi-processor processing sequentially-loaded first ultrasound data frames and said second integrated multi-processor further processing the sequentially-loaded first data frames to generate near real-time image data for visual display.

6. An ultrasound signal processing apparatus, comprising:

an image processing apparatus receiving real-time data frames of either one of ultrasound vector data or ultrasound raster data corresponding to a current ultrasound scan of a patient, the image processing apparatus for performing an image enhancement process on said received data frames to generate real-time or near real-time ultrasound images, said image processing apparatus programmable to receive object code embodying the image enhancement process, the image processing apparatus comprising:

a pair of frame buffers for receiving said data frames;

a first multi-processor (i) for accessing a first ultrasound data frame from either one or both of said pair of frame buffers, (ii) for executing first processing tasks upon the first ultrasound data frame to generate a first-processed data frame, and (iii) for generating a first processor completion signal upon completing said first processing tasks;

memory for storing the first-processed data frame;

a second integrated multi-processor (i) for receiving the first processor completion signal and in response executing second processing tasks upon the first-processed data frame to generate a second-processed data frame, and (ii) for moving the second,processed data frame;

a crossbar switch for coupling said memory to each of said first and second integrated multi-processors, said first-processed data frame accessible by said second integrated multi-processor through said memory and crossbar switch; and an output buffer for receiving the second-processed data frame; and wherein the first processing tasks and second-processing tasks comprise ultrasound image processing tasks; and in which the pair of frame buffers comprise:

a first register for receiving ultrasound raster data;

a second register for receiving ultrasound vector data;

a first frame buffer for storing one ultrasound data frame comprising either one or both of said-vector data and raster data;

a second frame buffer for storing another ultrasound data frame comprising either one or both of said vector data and raster data;

a first demultiplexer for selecting a data path between said first frame buffer and either one of said first register, second register and first multi-processor;

a second demultiplexer for selecting a data path between said second frame buffer and either one of said first register, second register and first multi-processor;

and wherein said frame controller configures said first and second demultiplexers and determines whether said first ultrasound data frame is stored in said first frame buffer as said one ultrasound data frame or in said second frame buffer as said another ultrasound data frame.

7. The apparatus of claim 6, in which said pair of frame buffers further comprise:

a first multiplexer for selecting an output data path from said first frame buffer coupling at a given time said first frame buffer to one of said second register and said first multi-processor;

a second multiplexer for selecting an output data path from said second frame buffer coupling at a given time said second frame buffer to one of said second register and said first multi-processor; and and wherein said frame controller configures said first and second multiplexers and determines from which frame buffer data is output.

8. An ultrasound signal processing apparatus, comprising:

an image processing apparatus receiving real-time data frames of either one of ultrasound vector data or ultrasound raster data corresponding to a current ultrasound scan of a patient, the apparatus for performing an image enhancement process on said received data frames to generate real-time or near real-time ultrasound images, said image processing apparatus programmable to receive object code embodying the image enhancement process;

a scan conversion processing apparatus receiving real-time data frames of ultrasound vector data corresponding to a current ultrasound scan of a patient, the scan conversion processing apparatus for adjusting the content of a data frame into cartesian-coordinate raster data, said scan conversion processing apparatus programmable to receive object code embodying a scan conversion process; and a vector processing apparatus receiving real-time data frames of ultrasound vector data corresponding to a current ultrasound scan of a patient, the vector processing apparatus for performing any one or more of: (i) improving signal to noise ratio of an ultrasound echo signal, (ii) identifying flow within a scanned area of a patient by analyzing flow parameters in an ultrasound flow signal, and (iii) identifying and removing doppler shift from an ultrasound doppler signal; and said vector processing apparatus programmable to receive object code embodying a vector processing task; and wherein at least one of said image processing apparatus, scan conversion processing apparatus and vector processing apparatus comprise:

a pair of frame buffers for receiving said data frames;

a first processor for accessing a first ultrasound data frame from either one or both of said pair of frame buffers, (ii) for executing first processing tasks upon the first ultrasound data frame to generate a processed data frame, and (iii) for generating a first processor completion signal upon completing said first processing tasks; and an output buffer for receiving the processed data frame.

9. The ultrasound signal processing apparatus of claim 8, in which said image processing apparatus, scan conversion processing apparatus and vector processing apparatus together comprise the pair of frame buffers, the first processor, and the output buffer.

10. The ultrasound signal processing apparatus of claim 8, in which the first processor is a first multi-processor and the processed data frame is a first-processed data frame, and in which said at least, one of said image processing apparatus, scan conversion processing apparatus and vector processing apparatus, further comprises:

memory for storing the first-processed data frame;

a second integrated multi-processor (i) for receiving the first processor completion signal and in response executing second processing tasks upon the first-processed data frame to generate a second-processed data frame, and (ii) for moving the second-processed data frame;

a crossbar switch for coupling said memory to each of said first and second integrated multi-processors, said first-processed data frame accessible by said second integrated multi-processor through said memory and crossbar switch; and an output buffer for receiving the second-processed data frame; and wherein the first processing tasks and second-processing tasks comprise ultrasound image processing tasks.

11. A programmable ultrasound signal processing apparatus receiving ultrasound data, comprising:

a pair of frame buffers receiving real-time data frames of either one or both of ultrasound vector data or ultrasound raster data corresponding to a current ultrasound scan of a patient;

a first integrated multi-processor (i) for accessing a first ultrasound data frame from either one or both of said pair of frame buffers, (ii) for executing first processing tasks upon the first ultrasound data frame to generate a first-processed data frame, and (iii) for generating a first processor completion signal upon completing said first processing tasks, said first multi-processor programmable for receiving object code corresponding to alternative first processing tasks;

memory for storing the first-processed data frame;

a second integrated multi-processor (i) for receiving the first processor completion signal and in response executing second processing tasks upon the first-processed data frame to generate a second-processed data frame, and (ii) for moving the second-processed data frame, said second multi-processor programmable for receiving object code corresponding to alternative second processing tasks;

a crossbar switch for coupling said memory to each of said first and second integrated multi-processors, said first-processed data frame accessible by said second integrated multi-processor through said memory and crossbar switch; and an output buffer for receiving the second-processed data frame.

12. The apparatus of claim 11, wherein either one or both of the first processing tasks and second-processing tasks comprise ultrasound image processing tasks for generating real-time or near real-time ultrasound images, 13. The apparatus of claim 11, wherein either one or both of the first processing tasks and second processing tasks comprise scan conversion tasks.

14. The apparatus of claim 11, further comprising:
   a frame controller for determining which one of the pair of frame buffers receives incoming data of the first ultrasound data frame at a given time; and
   an output buffer controller for outputting the second-processed data frame in response to a control signal from the second multi-processor.

15. The apparatus of claim 11, in which intermittent frames in a sequence of ultrasound data frames are dropped when a frame buffer is unavailable for loading resulting in a sequence of near real-time first ultrasound data frames being loaded into the pair of frame buffers, said first integrated multi-processor processing sequentially-loaded first ultrasound data frames and said second integrated multi-processor further processing the sequentially-loaded first data frames to generate near real-time data for output.

16. A programmable ultrasound signal processing apparatus receiving ultrasound data, comprising:
   a pair of frame buffers for receiving frames of either one or both of ultrasound vector data or ultrasound raster data corresponding to a current ultrasound scan of a patient;
   a first integrated multi-processor (i) for accessing a first ultrasound data frame from either one or both of said pair of frame buffers, (ii) for executing first processing tasks upon the first ultrasound data frame to generate a first-processed data frame, and (iii) for generating a first processor completion signal upon completing said first processing tasks, said first multi-processor programmable for receiving object code corresponding to alternative first processing tasks;
   memory for storing the first-processed data frame;.
   a second integrated multi-processor (i) for receiving the first processor completion signal and in response executing second processing tasks upon the first-processed data frame to generate a second-processed data frame, and (ii) for moving the second-processed data frame, said second multi-processor programmable for receiving object code corresponding to alternative second processing tasks;
   a crossbar switch for coupling said memory to each of said first and second integrated multi-processors, said first-processed data frame accessible by said second integrated multi-processor through said memory and crossbar switch; and
   an output buffer for receiving the second-processed data frame; and
   wherein either one or both of the first processing tasks and second processing tasks comprise vector processing tasks.

17. A programmable ultrasound signal processing apparatus receiving ultrasound data, comprising:
   a pair of frame buffers for receiving frames of either one or both of ultrasound vector data or ultrasound raster data corresponding to a current ultrasound scan of a patient;
   a first integrated multi-processor (i) for accessing a first ultrasound data frame from either one or both of said pair of frame buffers, (ii) for executing first processing tasks upon the first ultrasound data frame to generate a first-processed data frame, and (iii) for generating a first processor completion signal upon completing said first processing tasks, said first multi-processor programmable for receiving object code corresponding to alternative first processing tasks;
   memory for storing the first-processed data frame;
   a second integrated multi-processor (i) for receiving the first processor completion signal and in response executing second processing tasks upon the first-processed data frame to generate a second-processed data frame, and (ii) for moving the second-processed data frame, said second multi-processor programmable for receiving object code corresponding to alternative second processing tasks;
   a crossbar switch for coupling said memory to each of said first and second integrated multi-processors, said first-processed data frame accessible by said second integrated multi-processor through said memory and crossbar switch; and
   an output buffer for receiving the second-processed data frame; and
   wherein either one or both of the first processing tasks and second processing tasks comprise deriving vector processing parameters for output to a vector processing subsystem.

18. A programmable ultrasound signal processing apparatus receiving ultrasound data, comprising:
   a pair of frame buffers for receiving frames of either one or both of ultrasound vector data or ultrasound raster data corresponding to a current ultrasound scan of a patient;
   a first integrated multi-processor (i) for accessing a first ultrasound data frame from either one or both of said pair of frame buffers, (ii) for executing first processing tasks upon the first ultrasound data frame to generate a first-processed data frame, and (iii) for generating a first processor completion signal upon completing said first processing tasks, said first multi-processor programmable for receiving object code corresponding to alternative first processing tasks;
   memory for storing the first-processed data frame;
   a second integrated multi-processor (i) for receiving the first processor completion signal and in response executing second processing tasks upon the first-processed data frame to generate a second-processed data frame, and (ii) for moving the second-processed data frame, said second multi-processor programmable for receiving object code corresponding to alternative second processing tasks;
   a crossbar switch for coupling said memory to each of said first and second integrated multi-processors, said first-processed data frame accessible by said second integrated multi-processor through said memory and crossbar switch; and
   an output buffer for receiving the second-processed data frame; and
   in which the pair of frame buffers comprise:
   a first register for receiving ultrasound raster data;
   a second register for receiving ultrasound vector data;
   a first frame buffer for storing one ultrasound data frame comprising either one or both of said vector data and raster data;
   a second frame buffer for storing another ultrasound data frame comprising either one or both of said vector data and raster data;

a first demultiplexer for selecting a data path between said first frame buffer and either one of said first register, second register and first multi-processor;

a second demultiplexer for selecting a data path between said second frame buffer and either one of said first register, second register and first multi-processor;

and wherein said frame controller configures said first and second demultiplexers and determines whether said first ultrasound data frame is stored in said first frame buffer as said one ultrasound data frame or in said second frame buffer as said another ultrasound data frame.

19. The apparatus of claim 18, in which said pair of frame buffers further comprise:

a first multiplexer for selecting an output data path from said first frame buffer coupling at a given time said first frame buffer to one of said second register and said first multi-processor;

a second multiplexer for selecting an output data path from said second frame buffer coupling at a given time said second frame buffer to one of said second register and said first multi-processor; and and wherein said frame controller configures said first and second multiplexers and determines from which frame buffer data is output.

* * * * *

UNITED STATES PATENT AND TRADEMARK OFFICE
CERTIFICATE OF CORRECTION

PATENT NO. : 5,492,125
DATED : February 20, 1997
INVENTOR(S) : Kim et al.

It is certified that error appears in the above-indentified patent and that said Letters Patent is hereby corrected as shown below:

Column 13, claim 1, line 19, change "all" to -- an --

Signed and Sealed this

Third Day of February, 1998

Attest:

BRUCE LEHMAN

Attesting Officer     Commissioner of Patents and Trademarks